United States Patent [19]
Bodine

[11] 3,914,883
[45] Oct. 28, 1975

[54] SONIC TREE HARVESTER AND METHOD

[76] Inventor: Albert G. Bodine, 7877 Woodley Ave., Van Nuys, Calif. 91406

[22] Filed: Nov. 26, 1973

[21] Appl. No.: 418,831

Related U.S. Application Data

[63] Continuation-in-part of Ser. No. 220,250, Jan. 24, 1972, Pat. No. 3,783,954, which is a continuation-in-part of Ser. No. 124,349, March 15, 1971, Pat. No. 3,688,824.

[52] U.S. Cl. .................................. 37/2 R; 37/195
[51] Int. Cl.² ........................................... A01G 23/06
[58] Field of Search ......... 37/2 R, 2 P, 195; 172/40; 171/51

[56] References Cited
UNITED STATES PATENTS

| | | | |
|---|---|---|---|
| 2,990,630 | 7/1961 | Crawford | 37/2 R |
| 3,017,707 | 1/1962 | Sigler et al. | 37/2 R |
| 3,017,709 | 1/1962 | Sigler | 37/2 R |
| 3,041,811 | 7/1962 | Sides | 37/2 P |
| 3,594,931 | 7/1971 | Yost | 37/2 R |
| 3,747,687 | 7/1973 | Bodine | 172/40 |

FOREIGN PATENTS OR APPLICATIONS

| | | | |
|---|---|---|---|
| 265,602 | 3/1970 | U.S.S.R. | 37/2 R |

Primary Examiner—Edgar S. Burr
Assistant Examiner—R. E. Suter
Attorney, Agent, or Firm—Edward A. Sokolski

[57] ABSTRACT

A cutter blade structure is placed around the trunk of a tree to be harvested, and the blades thereof are driven vertically downwardly into the earth to sever the roots of the tree. Such downward driving action is achieved by imparting high level sonic energy to the blade structure in unidirectional pulses; this energy being generated by means of a sonic oscillator and fed to the cutting blade structure through a sonic rectifier. After the tree roots have been severed, a puller member is clamped to the trunk of the tree and the tree pulled out of the ground along with its taproot, while simultaneously applying sonic energy so as to facilitate the separation of the taproot from the ground.

13 Claims, 6 Drawing Figures

SONIC TREE HARVESTER AND METHOD

This application is a continuation-in-part of my application Ser. No. 220,250, filed Jan. 24, 1972, now U.S. Pat. No. 3,783,954 and of my application Ser. No. 124,349, filed Mar. 15, 1971 now Pat. No. 3,688,824, of which my aforementioned application is a continuation-in-part.

This invention relates to the harvesting of trees, and more particularly to an apparatus and technique utilizing sonic energy for separating tree trunks from the ground.

In the harvesting of trees by conventional techniques, the tree trunks are generally severed a short distance above the ground level, leaving stumps protruding above the ground, the root structure of the tree remaining intact within the ground. This type of harvesting has two shortcomings. First, the tree stumps present an unsightly appearance, and if the land is to be used for some other purposes, such as home construction, the stumps must be removed later in what is often a difficult and laborious process. Further, a good deal of good lumber is lost in the lower portions of the tree trunk and the taproots with this type of approach.

In my U.S. Pat. No. 3,688,824 and the aforementioned patent application Ser. No. 220,250 of which the present application is a continuation-in-part, a sonic technique for cutting standing timber is described whereby the tree trunks can be cut very close to the ground. This obviates some of the aforementioned shortcomings of the prior art in that it leaves little or no stump in the ground. However, it still does not provide for removal of the taproots.

The present invention provides an improvement over that of my prior applications in enabling the removal of the entire tree trunk from the ground by successive operations, the first of which involves the severing of the root structure from the taproot, and the second of which involves the pulling of the tree trunk from the ground along with its taproot structure.

It is therefore an object of this invention to facilitate the harvesting of timber.

It is a further object of this invention to increase the recovery of lumber in the harvesting of timber.

It is still a further object of this invention to provide an efficient means for harvesting timber wherein no tree stumps are left remaining in the ground.

Other objects of the invention will become apparent as the description proceeds in connection with the accompanying drawings, of which:

FIG. 6 is a cross sectional view illustrating a hydraulic spring which may be used in the embodiment of FIG. 1.

Figure 1:
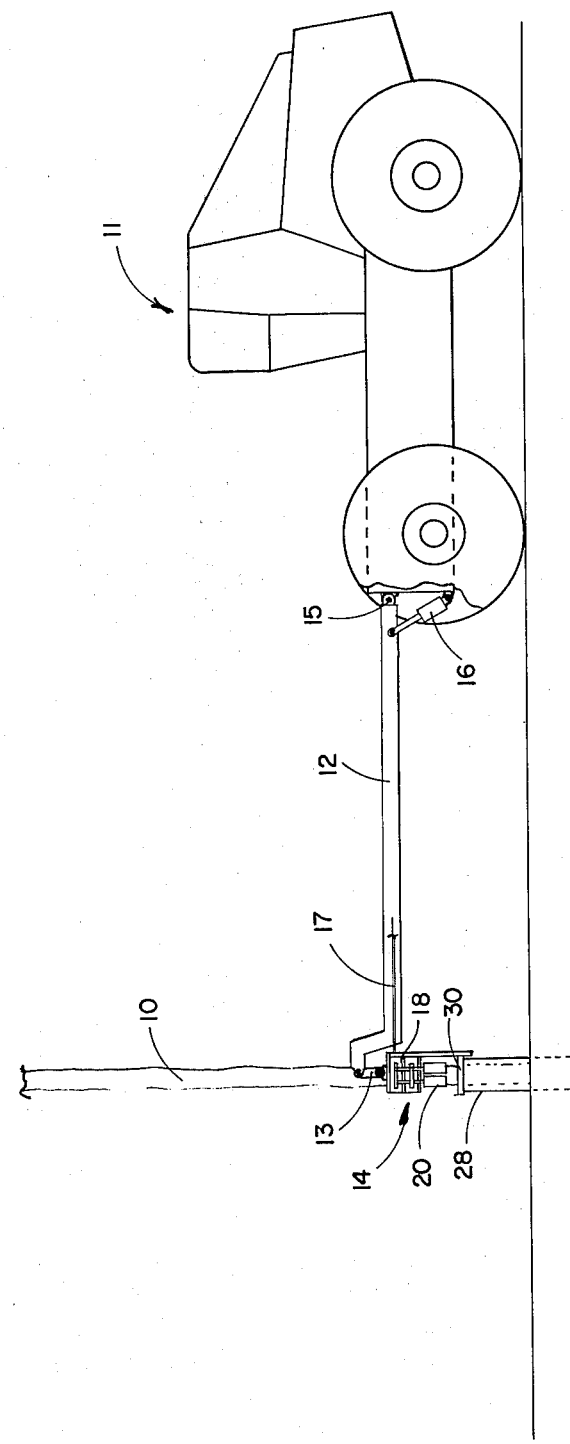
FIG. 1 is a schematic drawing illustrating one embodiment of the invention.

Briefly described, a preferred embodiment of the apparatus and method of this invention is as follows: A cutter blade structure is formed in two pieces which can be placed about the trunk of a tree to encircle such trunk. The cutter blade structure has cutting edges along the bottom thereof, and at the top portion thereof is attached to a portion of a clamping structure. Mounted on a support frame is the aforementioned clamping mechanism which is used for removably clamping the frame structure to the truck of the tree to be removed. Also mounted on the frame structure is a mechanical oscillator which may be in the form of one or more orbiting mass oscillators. A resonator structure may also be included on the support frame. A gap is provided in the coupling between the clamping structure and the cutter blade structure so as to afford sonic rectification of the sonic energy coupled to the cutter blades.

In operation, means are provided to rotatably drive the mechanical oscillator so as to set up resonant vibration of the resonator system. Such operation is initially provided with the clamp disengaged from the tree trunk and with the cutter blade structure with its cutter blades resting on the ground and biased thereagainst by its own weight and that of its associated structure. The cutter blades are thus sonically driven into the ground to effectively sever the tree roots and to fluidize the earth therearound so as to somewhat loosen the root structure from the ground. After the tree roots have been severed, the clamping mechanism is clamped to the tree trunk and the sonic energy applied thereto, while a lifting force is simultaneously applied to the frame by means of a lift vehicle, the sonic energy serving to loosen the tree taproots and remaining root sections from the earth so that they can be lifted out of the ground by the lift vehicle.

It has been found most helpful in analyzing the method and device of this invention to analogize the acoustically vibrating circuit utilized to an equivalent electrical circuit. This sort of approach to analysis is well known to those skilled in the art and is described, for example, in Chapter 2 of "Sonics" by Hueter and Bolt, published in 1955 by John Wiley & Sons. In making such an analogy, force F is equated with electrical voltage E, velocity of vibration $u$ is equated with electrical current $i$, mechanical compliance $C_m$ is equated with electrical capacitance $C_e$, mass M is equated with electrical inductance L, mechanical resistance (friction) $R_m$ is equated with electrical resistance R and mechanical impedance $Z_m$ is equated with electrical impedance $Z_e$.

Thus, it can be shown that if a member is elastically vibrated by means of an acoustical sinusoidal force $F_o \sin\omega t$ ($\omega$ being equal to $2\pi$ times the frequency of vibration), that $$Z_m + R_m + j\left(\omega M - \frac{1}{\omega C_m}\right) = \frac{F_o \sin\omega t}{u} \quad (1)$$

Where $\omega M$ is equal to $(1/\omega C_m)$, a resonant condition exists, and the effective mechanical impedance $Z_m$ is equal to the mechanical reistance $R_m$, the reactive impedance components $\omega M$ and $(1/\omega C_m)$ cancelling each other out. Under such a resonant condition, velocity of vibration $u$ is at a maximum, power factor is unity, and energy is more efficiently delivered to a load to which the resonant system may be coupled.

It is important to note the significance of the attainment of high acoustical Q in the resonant system being driven, to increase the efficiency of the vibration thereof and to provide a maximum amount of power. As for an equivalent electrical circuit, the Q of an acoustically vibrating system is defined as the sharpness of resonance thereof and is indicative of the ratio of the energy stored in each vibration cycle to the energy used in each such cycle. Q is mathematically equated to the ratio between $\omega M$ and $R_m$. Thus, the effective Q of the vibrating system can be maximized to make for highly efficient, high-amplitude vibration by minimizing the effect of friction in the system and/or maximizing the effect of mass in such system. In this instance, the Q can be made large by having a large resonator system in back of the rectifier.

The instantaneous displacement, y, of a sinusoidally vibrating mass can be represented by the following equations:

$$y = Y \cos \omega t \qquad (2)$$

where Y is the maximum displacement in the vibration cycle and $\omega$ is the angular velocity of such displacement.

The acceleration, a, of the mass can be obtained by differentiating equation (2) twice, as follows:

$$a = \frac{d^2 y}{dt^2} = - Y\omega^2 \cos (\omega t) \qquad (3)$$

The acceleration thus is a function of $107^2$ which is equal to $(2\pi f)^2$. It thus should be apparent that very high G acceleration can be obtained in a vibratory system at even moderate vibration frequencies. This is especially effective in cutting off underground tree roots.

In considering the significance of the parameters described in connection with equation (1), it should be kept in mind that the total effective resistance, mass, and compliance in the acoustically vibrating system are represented in the equation and that these parameters may be distributed throughout the system rather than being lumped in any one component or portion thereof.

It is also to be noted that orbiting mass oscillators are preferably utilized in the implementation of the invention that automatically adjust their output frequency and phase to maintain resonance with changes in the characteristics of the load. Thus, in the face of changes in the effective mass and compliance presented by the load with changes in the conditions of the work material as it is sonically excited, such as the changes in trunk stiffness as the removal thereof from the ground is progressed, the system automatically is maintained in optimum resonant operation by virtue of the "lock-in" characteristic of Applicant's unique orbiting mass oscillator used here. Furthermore, in this connection the orbiting mass oscillator automatically changes not only its frequency but its phase angle and therefore its power factor with changes in the resistive impedance load, such as changes in frictional grip on the blade, to assure optimum efficiency of operation at all times. The vibrational output from such orbiting-mass oscillators also tends to be constrained by the resonator to be generated along a controlled predetermined coherent path to provide maximum output along a desired axis.

Referring now to FIG. 1, one embodiment of the invention is illustrated. Tractor 11 has a support arm 12 which extends therefrom, this support arm supporting frame structure 14 through support link 13. Support arm 12 is connected to tractor 11 by means of pivot joint 15, such that it is free to move relative to the tractor. The support arm may be raised or lowered by means of hydraulic cylinder 16 which is supported on the tractor and linked to the arm.

Frame structure 14, as to be explained more fully further on in the specification, supports an orbiting mass oscillator and a resonator structure 18. The orbiting mass oscillator is rotatably driven by means of drive shaft 17. Shaft 17 is rotatably driven by means of an engine (not shown) mounted on tractor 11. Also supported on frame 14 is a clamping mechanism 20 for use in clamping certain portions of the frame structure to tree 10 to be removed. Supported on the lower portions of frame structure 14 is cutter blade assembly 28.

Figure 2:
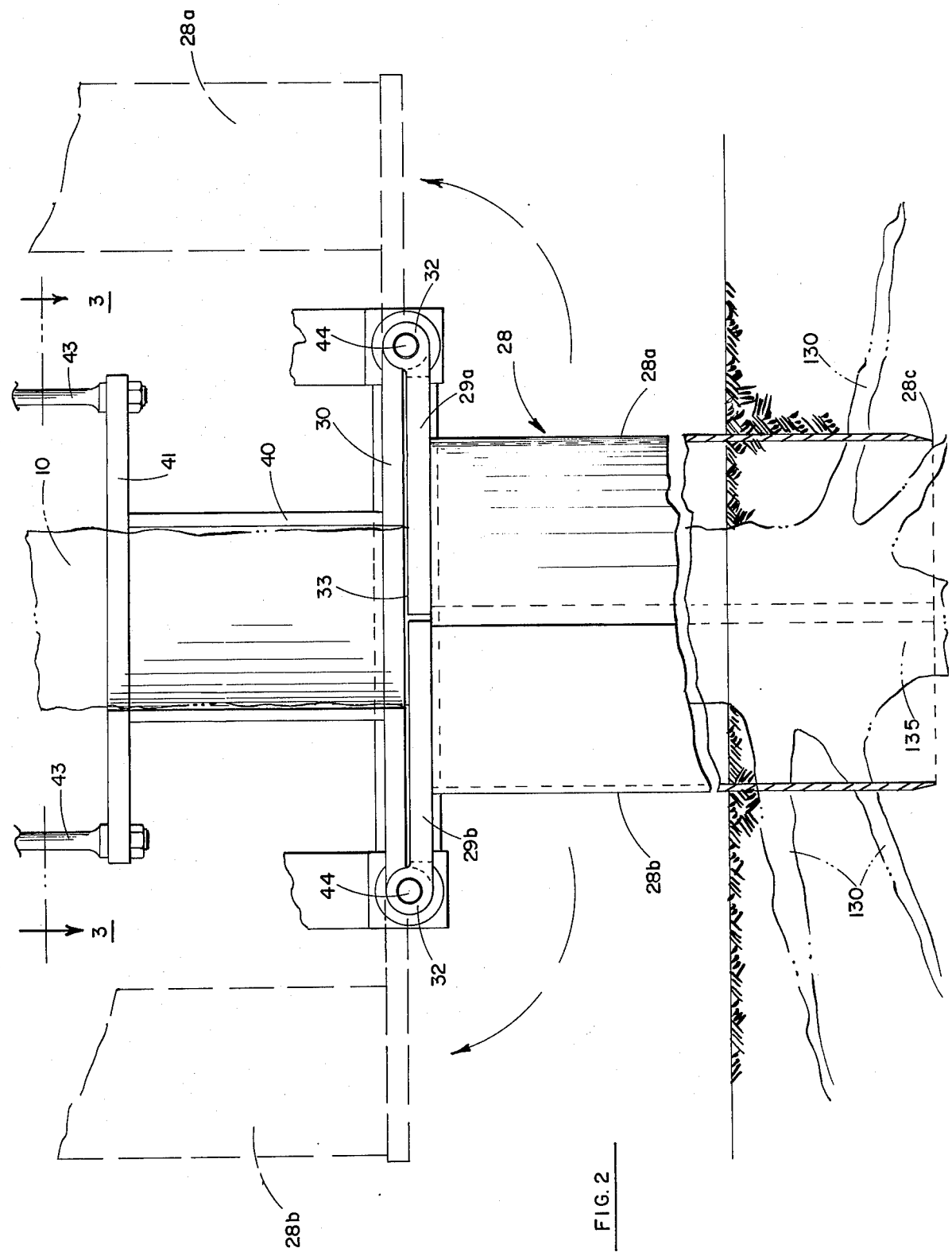
FIG. 2 is an elevational view of the cutter blade structure of the embodiment of FIG. 1.
Figure 3:
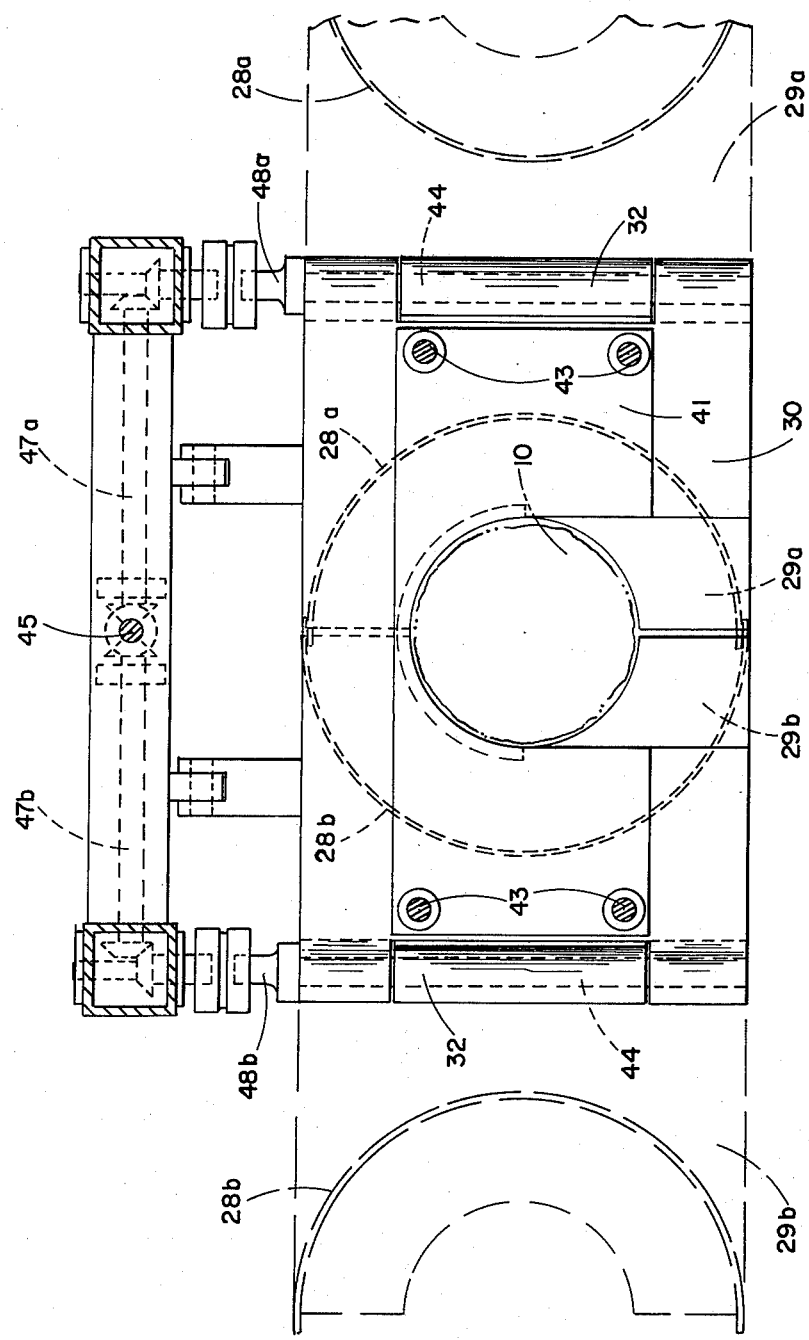
FIG. 3 is a view taken along the plane indicated by 3—3 in FIG. 2.

Referring now to FIGS. 2, 3, 4 and 5, an embodiment of the cutter blade assembly is illustrated. Cutter blade assembly 28 is supported by means of hinges 32 on plate member 30 which extends across the bottom of plate 40 which is in the shape of a half-cylinder. Plate 40 extends downwardly from plate 41 which in turn is attached to plate 42 (see FIG. 47 by means of rods 43. Plate 42 is attached to the bottom of fixed clamping jaw 95 (see FIG. 4). A small gap 33 is formed between the top edges of cutter blade assembly 28 and plate 30, this gap forming a "rectifier" gap for use in rectifying the sonic energy, as to be explained more fully further on in the specification. Cutter blade assembly 28 includes a pair of half-cylindrical sections 28a and 28b, which in their installed position as shown in FIGS. 2 and 3, surround the tree trunk 10. The blades extend from respective plate portions 29a and 29b which are supported for rotatable movement on trunions 44. The blades 28a and 28b are kept in the position indicated by the dotted lines when not in use and are lowered into position about the tree trunk for performing their cutting operation by means of the drive assembly including drive shafts 45, 47a and 47b, 48a and 48b, and the associated bevel gears as shown in FIG. 3. Shaft 45 is coupled by means not shown to shaft 50 (shown in FIG. 4) (see FIG. 4), which is selectively coupled to shaft 17 by means of a gear box and clutch mechanism (not shown).

Figure 4:
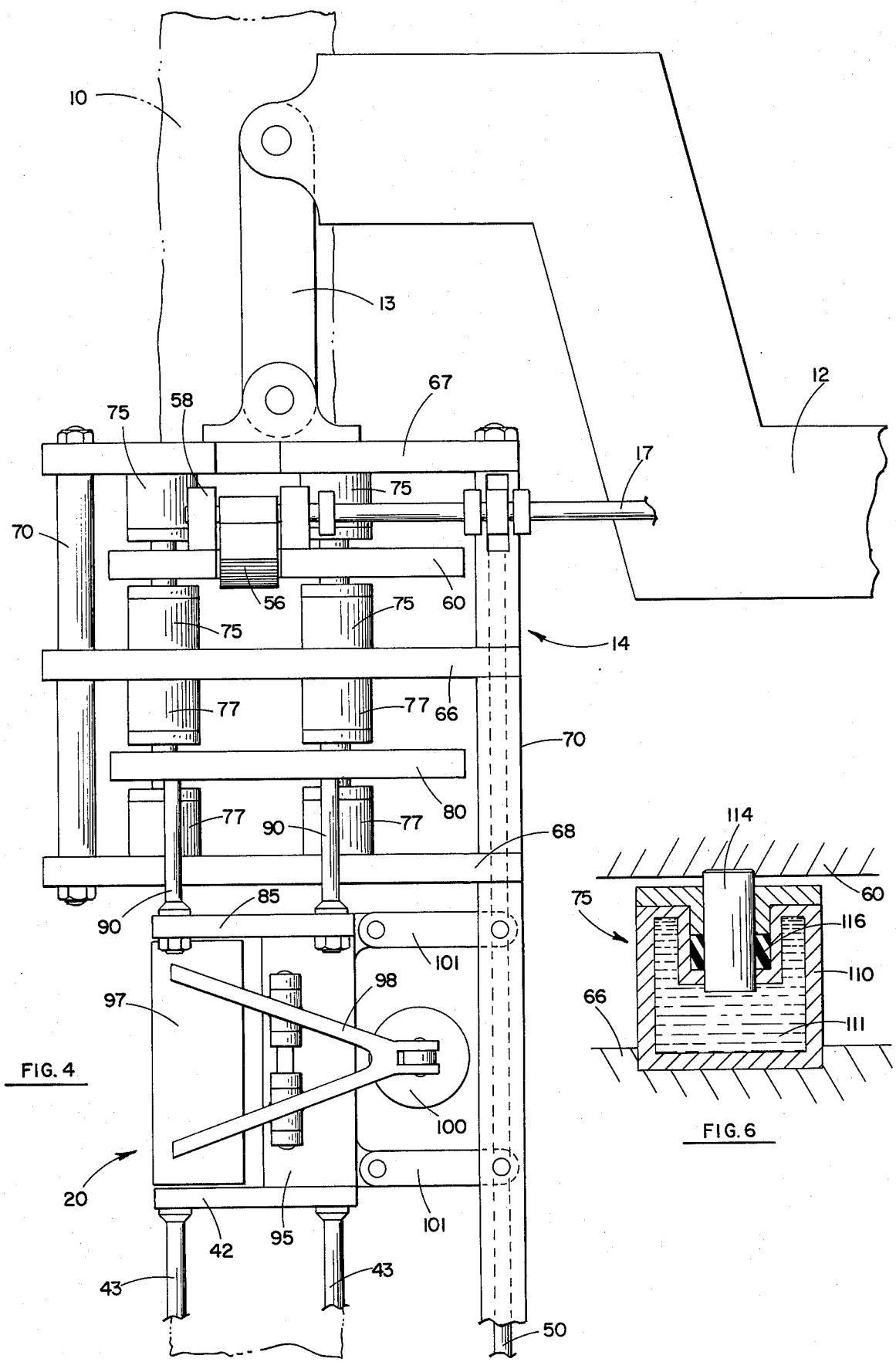
FIG. 4 is an end elevational view of the frame structure and clamping mechanism of the embodiment of FIG. 1.
Figure 5:
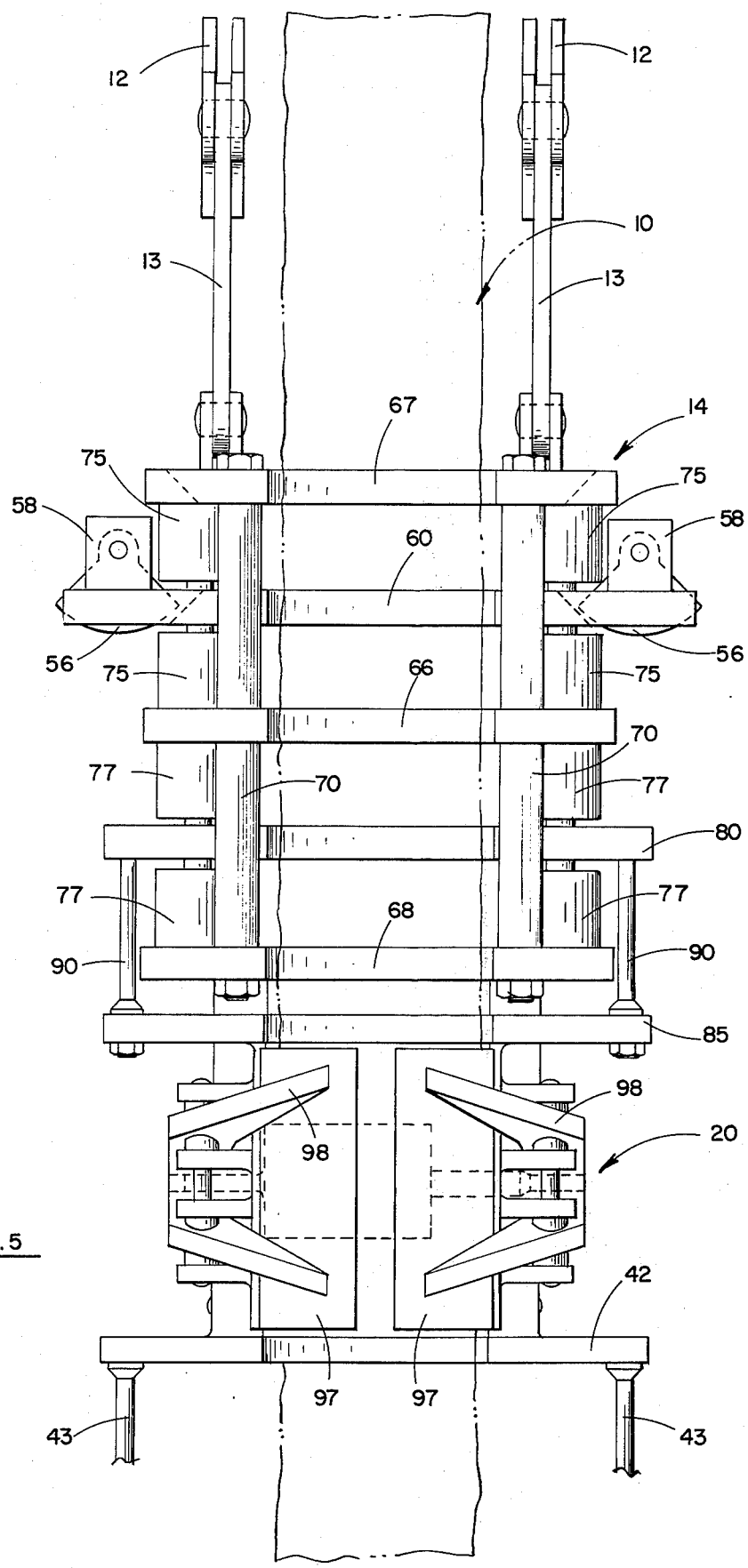
FIG. 5 is a side elevational view of the structure of FIG. 4.

Referring now to FIGS. 4 and 5, an embodiment of the oscillator and optional resonator structure and clamping mechanism is illustrated. An orbiting mass oscillator is formed by a pair of eccentrically supported rotors 56, which are rotatably driven in opposite directions by means of drive shaft 17 and a gear box (not shown) interposed between the drive shaft and the rotor shafts. The oscillator may be of the type described in my U.S. Pat. Nos. 2,897,734 and 3,417,966 to provide vibrational energy which is principally vertically directed. The support bearings 58 for rotors 56 are mounted on resonator plate 60. Resonator plate 60 is supported between plates 66 and 67, which form part of the frame structure 14, by means of hydraulic springs 75. Plates 66, 67 and 68 are joined together by means of rods 70. A second resonator plate 80 is supported between plates 66 and 68 by means of hydraulic springs 77. Resonator plate 80 is joined to plate 85 by means of rods 90.

Supported on plate 85 is a fixed clamping jaw 95. Movable clamping jaws 97 are supported by means of arms 98 on hydraulic drive member 100. Fixed clamping jaw 95 is coupled to one of rods 70 by means of link arms 101 which permit vibratory motion of the jaw relative to the frame. The hydraulic drive may be actuated to cause the jaws to clampingly engage tree trunk 10 as shown in FIG. 5.

The structure of the hydraulic springs is shown in FIG. 6 and, as can be seen, includes an outer casing 110 having a suitable liquid 111, such as silicon oil, contained therein. A piston element 114 is slidably fitted in casing 110 with a liquid tight seal being formed between the sides of the piston and the casing by means of packing ring 116. Casing 110 is fixedly attached to one plate 66, while piston 114 is connected to another plate 60.

The device of the invention is operated as follows: Oscillator rotors 56 are rotatably driven at a speed such as to set up resonant vibration of the resonating system which includes hydraulic springs 75 and resonator plate 60. This resonant energy is transferred from plate 66 to the resonant system including resonator plate 80 and hydraulic springs 77. This second resonant system is designed to have the same natural resonant vibration frequency as the first mentioned system, and thus vibrates sympathetically with the first mentioned system. The vibratory energy is transferred from the second system through rods 90 to plate 85 and thence to clamping jaw 95 and plate 30. If it is desired to operate without resonance, the elements 75 and 77 may be solid cylindrical members that do not have elastic function. Oscillators 56 then deliver vibratory energy directly to cutters 28 and clamps 20 by vibrating the entire structure 14 and the end of support arm 12.

The first operation involves the severing of the root structure of the tree by means of cutter blade structure 28. In this operation, the cutter blades are placed in position around the tree trunk, as shown in FIGS. 2 and 3, and the oscillator operated to provide sonic energy to plate 30. This sonic energy is transferred to the upper portions 28a of the cutter blade structure from plate 30 in unidirectional pulses of energy. This end result is achieved by virtue of the rectifier gap 33 formed between plate 30 and the upper portion 28a of the cutter blade structure. Thus on the downward vibratory excursions of plate 30 pulsating energy is transferred to the cutter blades. This energy operates to drive the cutting edges 28c of the blades through the root structure 130 of the tree, as shown in FIG. 2. It is to be noted that the vibratory action operates in conjunction with the bias force on the cutting blade structure provided by its own weight and that of associated components.

When the tree roots have been thoroughly severed, the movable clamping jaws 97 are actuated so that the jaws clamp against the tree trunk 10 in tight clamping engagement therewith as shown in FIG. 4 and 5. The vibratory energy is now transferred directly to the tree trunk while the hydraulic cylinder 16 is appropriately actuated to provide an upward pulling force on the trunk (see FIG. 1). The vibratory energy tends to loosen the tree trunk from the ground, and operating in conjunction with the lifting action of lift arm 12, pulls the tree trunk along with its taproots 135 out of the ground.

It thus should be apparent that the device and technique of the invention provides an efficient means for harvesting timber in a two step operation, the first of such steps involving severing of the root structure, the second of these steps involving the pulling out of the tree trunk along with its taproots, both of these steps involving the utilization of high level sonic energy in their implementation.

If desired, the cutting blade structure can be made so that it is detachable from the main frame and detached therefrom during the pulling operation so that the roots can be stripped off as the tree trunk is sonically pulled upwardly. In this manner, the two steps of cutting and pulling become one step.

While the invention has been described and illustrated in detail, it is to be clearly understood that this is intended by way of illustration and example only and is not to be taken by way of limitation, the spirit and scope of this invention being limited only by the terms of the following claims.

I claim:
1. A device for harvesting a tree comprising:
a frame structure,
a clamping mechanism mounted on said frame structure,
means for selectively driving said clamping mechanism into clamping engagement with said tree,
means including a resonant vibration system for generating high level sonic energy,
means for transferring said sonic energy to said clamping mechanism to cause resonant vibration thereof,
cutter means supported on said frame structure, said cutter means being positioned around the trunk of said tree and having blades placed in the earth around said trunk,
means for transferring unidirectional pulses of sonic energy from said generating means to said cutter means to cause resonant vibration thereof, and
means for exerting an upward pulling force on said clamping mechanism to lift the tree out of the ground,
whereby the cutter means is driven downwardly by said sonic energy to sever the roots of the tree and the clamping mechanism is driven into clamping engagement with the tree so as to transfer resonant sonic energy thereto to facilitate the lifting of the tree out of the ground.

2. The device of claim 1 wherein said cutter means comprises a pair of cutter blades shaped in the form of half-cylinders, means for pivotally supporting said blades and means for driving said blades between a first position away from the tree trunk and a second position around the tree trunk.

3. The device of claim 1 wherein said means for generating high level sonic energy comprises an orbiting mass oscillator driven at a speed such as to cause resonant vibration of said vibration system.

4. The device of claim 3 wherein said resonant vibration system is formed by first and second resonators each formed from a pair of plates with hydraulic springs mounted therebetween, one of said resonators operating in sympathetic relationship to the other of said resonators.

5. The device of claim 1 wherein said clamping mechanism comprises a fixed clamping jaw and a pair of movable clamping jaws, the means for transferring the sonic energy to the clamping mechanism including means for transferring said energy to said fixed clamping jaw.

6. The device of claim 1 wherein the means for transferring unidirectional pulses of sonic energy to said cutter means comprises sonic rectifier means.

7. A device for harvesting a tree comprising:
a frame structure, a clamping mechanism mounted on said frame structure comprising a fixed clamping jaw and a pair of movable clamping jaws, means for selectively driving said clamping jaws into clamping engagement with said tree, means including a resonant vibration system for generating high level sonic energy, said resonant vibration system being formed by first and second resonators each formed from a pair of plates with hydraulic springs mounted therebetween, said resonators operating in sympathetic relationship to each other, means for transferring sonic energy from said resonant vibration system to said clamping jaws, cutter means supported on said frame structure, said cutter means being positioned around the trunk of the tree and having blades placed in the earth around said trunk, and sonic rectifier means for transferring unidirectional pulses from said resonant vibration system to said cutter means, whereby the cutter means is first driven downwardly by said sonic energy to sever the roots of the tree and the clamping mechanism is then driven into clamping engagement with the tree so as to transfer resonant sonic energy thereto to facilitate the lifting of the tree out of the ground.

8. The device of claim 7 wherein said cutter means comprises a pair of cutter blades shaped in the form of half cylinders, means for pivotally supporting said blades and means for driving said blades between a first position away from the tree trunk and a second position around the tree trunk.

9. A method for harvesting trees comprising the steps of:

placing a cylindrical cutter mechanism around the trunk of the tree with the cutting blades thereof pointed downwardly, sonically driving said cutter mechanism into the ground at a frequency such as to resonantly vibrate the mechanism so as to drive the cutter blades with unidirectional pulses to sever the roots of the tree, when the roots have been severed, attaching a clamp mechanism to the trunk of the tree, transferring sonic energy to the clamp mechanism at a resonant frequency, said energy being transferred to the tree trunk to loosen the tree trunk from the ground while simultaneously exerting a pulling force on the tree trunk to pull the trunk from the ground along with its tap roots.

10. The method of claim 9 wherein the sonic driving of said cutter member and transferring of sonic energy to said clamp mechanism is accomplished by means of a sonic oscillator, the output of which is transferred to said cutter member and clamp mechanism.

11. The method of claim 9 wherein said sonic oscillator is an orbiting mass oscillator.

12. The method of claim 11 and further including resonantly driving a resonant vibration system with said oscillator, the output of said resonant vibration system being coupled to said cutter member and clamp mechanism.

13. The method of claim 9 wherein said cutter mechanism comprises a pair of half-cylindrical cutter blades, said blades being placed around the tree trunk by pivotally driving the blades from an upward position away from the tree trunk downwardly to a position where they surround the trunk.

* * * * *